No. 752,209. PATENTED FEB. 16, 1904.
H. DICKE.
WELDING APPARATUS.
APPLICATION FILED SEPT. 14, 1901.
NO MODEL. 2 SHEETS—SHEET 1.
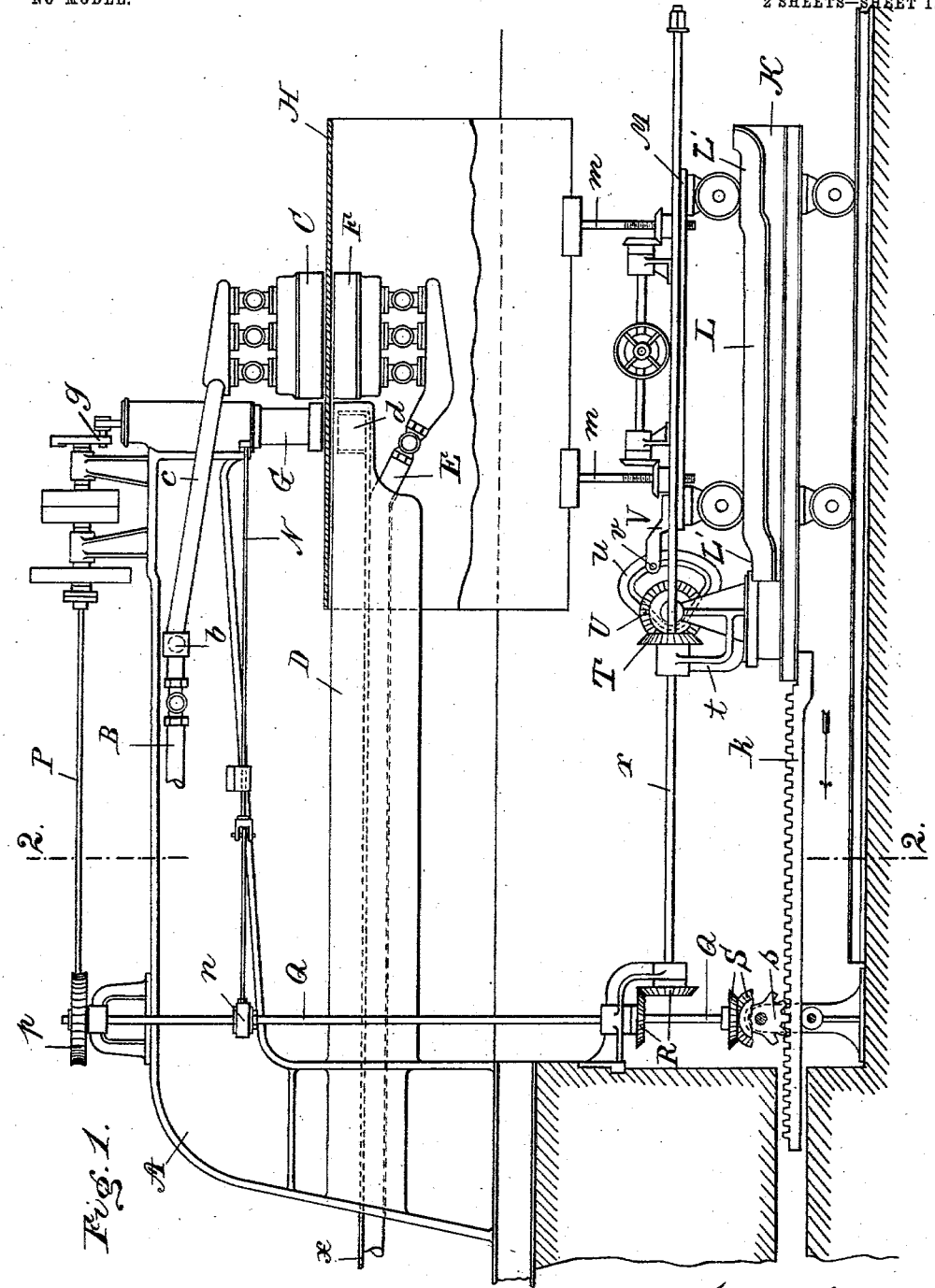

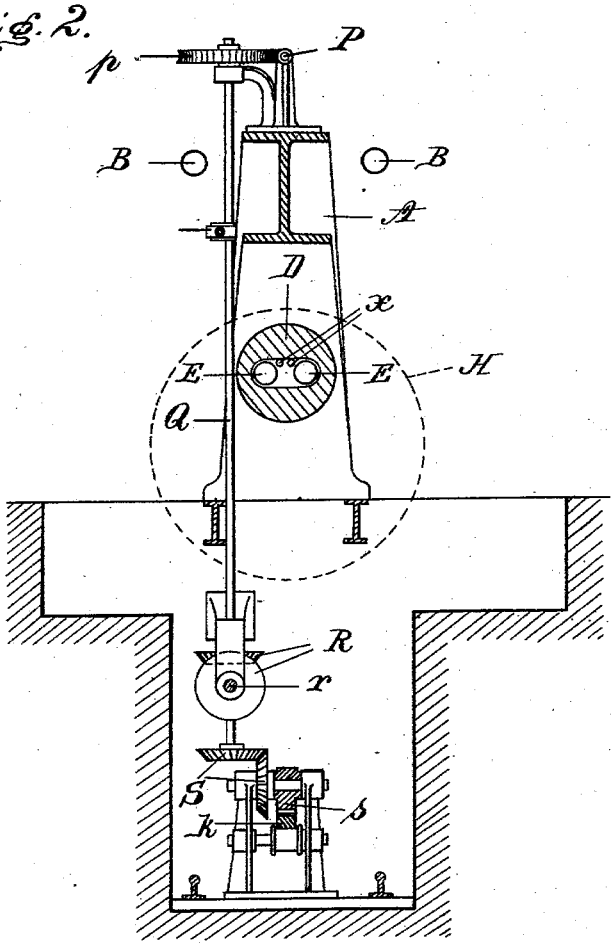

No. 752,209. Patented February 16, 1904.

UNITED STATES PATENT OFFICE.

HUGO DICKE, OF FRANKFORT-ON-THE-MAIN, GERMANY, ASSIGNOR TO JACOB EDUARD GOLDSCHMID, OF FRANKFORT-ON-THE-MAIN, GERMANY.

WELDING APPARATUS.

SPECIFICATION forming part of Letters Patent No. 752,209, dated February 16, 1904.

Application filed September 14, 1901. Serial No. 75,373. (No model.)

*To all whom it may concern:*

Be it known that I, HUGO DICKE, head engineer, residing at Neue Mainzerstrasse No. 14, Frankfort-on-the-Main, German Empire, have invented new and useful Improvements in Welding Apparatus, of which the following is a specification.

The present invention relates to an apparatus to be applied in heating and welding metal, wherein a flame or several flames, preferably of water-gas, is or are used for the purpose of locally heating a certain portion of the material with a view of welding parts of that portion. Especially the apparatus is adapted to heat automatically, continuously, and progressively the meeting edges of a tube or tubular article. When the work has been heated to the welding temperature, it is acted upon automatically by a hammer, whereupon a further piece of material can be similarly treated.

To this end the machine consists of two welding-burners or devices heating from the interior and from the exterior the portion of the tube to be welded. Furthermore, adjacent to these burners are an anvil and a hammer, between which the portion previously brought to welding heat is moved, with the object of being operated upon by the hammer.

The machine comprises also a feeding or tube-carrying device for advancing the work at regular intervals, so that the portions brought to welding heat are removed from the burners and brought under the hammer, and portions not yet heated are brought between the heating devices. After the welding has been completed a slight return movement of the work takes place, so that the welding device again heats the portion of the work which was between the heating device and the hammer. The hammer thus acts twice upon each portion of the welded material.

The invention is represented by the accompanying drawings, in which—

Figure 1 is an elevation of an apparatus for welding tubular articles according to this invention, and Fig. 2 a vertical section on the line 2 2 of Fig. 1.

The anvil D extends from the frame A toward and adjacent to the heating devices and carries the conduit or conduits E for the lower heating device F. The hammer G is arranged as close as possible to the heating device C. The work H is supported on a double carriage, the lower carriage of which, K, is given an intermittent advance movement and carries on its upper frame rail-tracks L. The upper carriage M is adapted to reciprocate upon the rails L.

The heating device C may be of any well-known construction, and the water-gas and air are supplied in any known manner. The upper heater C is carried by the feeding-tubes B and provided with tube-joints $b$, their front portions $c$ being movable upwardly and downwardly. The upward movement is necessary, so as to allow of a removal of the slag or other waste material formed in the welding process.

The hammer G is preferably operated by pneumatic mechanism—as, for example, that indicated in Fig. 1 of the drawings—wherein a crank $g$, driven from the power-shaft P, operates a pneumatic power-transmitter of a type well known to those skilled in the art, and the pneumatic mechanism is automatically controlled by a slide-valve operated from the power-shaft by means of rod N and eccentric $n$.

The anvil D is hollow and penetrated by the lower gas and air conduits E and also the tubes $x$, serving for cooling the anvil. A special water or other cooling device may be arranged in order to prevent the heating of the end $d$ of the anvil, owing to its nearness to the burner.

The shaft P, continuously driven and carrying the hammer-crank $g$, transmits its motion to the vertical shaft Q by means of a worm-wheel $p$. This shaft Q operates the slide N by means of an eccentric $n$, and by means of two bevel-gears R and S the upper carriage M and the lower carriage K are operated. The under carriage K is intermittently moved forward in the direction of the arrow, Fig. 1, by means of a toothed rack and a toothed sector $s$, connected with the bevel-wheel S. Consequently the sector will engage the rack $k$ as it rotates, and will thus move the carriage forward intermittently to an extent according to the number of its teeth.

A shaft r is rotated by means of the bevel-gearing R and is supported in bearings t on the carriage K. A bevel-wheel T is mounted upon the shaft r, so that it can move longitudinally thereon, but must rotate with the shaft. The bevel-wheel T engages a corresponding bevel-wheel U, upon which is mounted a cam-disk u, which engages a pin v, arranged upon an arm V of the supporting-carriage M, which is thus reciprocated upon the stepped rails L, said rails being provided with inclines L' L', so that the work between the burners C and F is periodically lowered after having been submitted to the heating device beneath the hammer G upon the end d of the anvil and is raised again on the reverse motion of the carriage. The work itself rests upon screw-supports m, which can be adjusted to the proper height.

The operation of the device above described is as follows: The tube or other article to be welded is mounted upon the brackets m, which brackets are so adjusted as to enable the work to clear the anvil during the heating operation. The burners C and F are lighted and continue to heat the metal throughout the entire operation. As the shaft P rotates it actuates the crank g, which in turn drives the pneumatic transmitting mechanism to operate the hammer; but the hammer is operated only when the slide-valve, actuated by rod N from the shaft Q, is retracted to establish communication between the actuator and the hammer, as will be well understood by those skilled in the art. The shaft Q, which is driven from the main power-shaft P, actuates a toothed sector s, which advances the lower carriage K at the same time the bevel-gears R drive the shaft r, which through the intermediacy of bevel-gears T and U actuates the cam-disk u, thereby advancing the upper carriage M concurrently with the lower carriage and to the same extent that the latter advances. When the toothed sector passes out of engagement with the rack K, the lower carriage stops; but the upper carriage is moved forward by the cam-disk upon the lower carriage and also lowered by means of the inclines in the tracks L, with the result that the work H is lowered into contact with an anvil D. At this time the eccentric n has actuated the slide-valve through the rod N, and thereby established connection between the pneumatic actuator and the hammer, so that the latter begins to operate upon the heated metal to weld the same. As the cam-disk u continues to rotate the carriage M is given a reverse movement upon the carriage K, and as it rides upon the inclines of rails L it raises the work out of contact with the anvil and carries a portion of the work which has been welded rearwardly between the burners, where it is reheated, to be again operated upon by the hammer as the work is subsequently advanced. This cycle of operations is repeated intermittently. The lower carriage is advanced a given distance, with a concurrent and equal advance of the upper carriage therewith, a subsequent limited independent advance of the upper carriage upon the lower carriage, accompanied by a lowering of the work upon the anvil due to the inclines in the tracks on the lower carriage, the operation of the hammer to weld that portion of the heated metal lying upon the anvil, and finally a backward movement of the upper carriage upon the lower carriage, accompanied by a lifting of the work out of contact with the anvil, a corresponding cessation of the operation of the hammer, and the reheating of a portion of the work which has been welded.

Now what I claim, and desire to secure by Letters Patent, is the following:

1. In an apparatus for welding tubes and the like, the combination with a heating device, of an anvil and an automatic hammer located adjacent to said heating device, means to automatically feed successive portions of the work to the heating device and between the anvil and hammer and mechanism coöperating with said feeding means to subsequently move the work into contact with the anvil, substantially as described.

2. In an apparatus for welding tubes and the like, the combination with a heating device, of an anvil and an automatic hammer located adjacent to said heating device, a feed mechanism for presenting successive portions of the work to the heating device and between the hammer and anvil, and means for imparting a positive forward movement and a subsequent smaller backward movement to said feed mechanism, whereby the successive portions of the work are reheated; substantially as described.

3. In an apparatus for welding tubes and the like, the combination of two gas-burners, an anvil and an automatic hammer located adjacent to the burners, a machine-frame having an upper arm supporting one burner, the hammer and the parts driving the hammer, a stationary lower arm, the front end of which serves as an anvil and supports the lower burner, mechanism for feeding successive portions of the work to the burners and between the hammer and anvil and means coöperating with said feeding mechanism for subsequently moving the work into contact with the anvil.

4. In an apparatus for welding metal tubes and the like, the combination of two gas-burners, an anvil and an automatic hammer adjacent to the burners, mechanism comprising a work-carriage to automatically feed the work between the two burners and the anvil and hammer, and means coöperating with said work-carriage for imparting to the latter a positive forward feeding movement terminating in a lowering movement and a subsequent small backward and rising movement whereby the work is fed from the burners to the anvil and lowered upon the latter and subsequently returned in part to the burners.

5. In an apparatus for welding metal tubes and the like, the combination of two gas-burners, an anvil, an automatic hammer located adjacent to the burners, two tube-supports, the one supported and movable on the other one, and to automatically and intermittently move the lower support forward and to move the upper support to and fro on the lower support, and whereby means to successively lower and raise the upper support on the lower support.

6. In an apparatus for welding metal tubes and the like, the combination of two gas-burners, an anvil, an automatic hammer located adjacent to the burners, two tube-supports, the one supported and movable on the other one, and means to automatically and intermittently move the lower support forward and to move the upper support to and fro on the lower support, and to raise the upper support when moving backward.

7. In an apparatus for welding metal tubes and the like, the combination of two gas-burners, an anvil, an automatic hammer located adjacent to the burners, and mechanism for feeding successive portions of the work to the burners and between the hammer and anvil, said mechanism comprising a lower table and means for intermittently advancing the same, an upper table movably mounted on the lower table and partaking of the intermittent advance thereof, a track on the lower table provided with inclines for raising and lowering the upper table and means connected with the upper table to reciprocate the latter upon the lower table.

In testimony whereof I have signed my name to this specification in the presence of two subscribing witnesses.

HUGO DICKE.

Witnesses:
HERMANN WEIL,
EVA SATTLER.